United States Patent
Wiesgickl

(10) Patent No.: US 8,230,146 B2
(45) Date of Patent: Jul. 24, 2012

(54) COMMUNICATION METHOD AND MASTER-SLAVE SYSTEM FOR A FIELD BUS CONFIGURED ACCORDING TO THE AS-INTERFACE STANDARD

(75) Inventor: Bernhard Wiesgickl, Vilseck (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 12/679,977

(22) PCT Filed: Sep. 4, 2008

(86) PCT No.: PCT/EP2008/061700
§ 371 (c)(1),
(2), (4) Date: Mar. 25, 2010

(87) PCT Pub. No.: WO2009/043675
PCT Pub. Date: Apr. 9, 2009

(65) Prior Publication Data
US 2010/0262736 A1    Oct. 14, 2010

(30) Foreign Application Priority Data
Sep. 28, 2007   (DE) .......................... 10 2007 046 440

(51) Int. Cl.
*G06F 13/00* (2006.01)
*G06F 15/17* (2006.01)
*G06F 11/16* (2006.01)
(52) U.S. Cl. ................ 710/110; 370/223; 714/4.11
(58) Field of Classification Search ............. 710/110
See application file for complete search history.

(56) References Cited

U.S. PATENT DOCUMENTS

| | | | |
|---|---|---|---|
| 4,745,597 A * | 5/1988 | Morgan et al. | 370/224 |
| 6,952,396 B1 * | 10/2005 | Cottreau et al. | 370/222 |
| 7,047,450 B2 * | 5/2006 | Iwamitsu et al. | 714/43 |
| 2002/0071386 A1 * | 6/2002 | Gronke | 370/217 |
| 2004/0008719 A1 * | 1/2004 | Ying | 370/460 |
| 2005/0068710 A1 * | 3/2005 | Burr et al. | 361/119 |
| 2006/0077917 A1 | 4/2006 | Brahmajosyula | |
| 2006/0101184 A1 * | 5/2006 | Hegarty | 710/307 |

FOREIGN PATENT DOCUMENTS

| | | |
|---|---|---|
| DE | 4339046 A1 | 5/1995 |
| DE | 10240669 A1 | 3/2004 |
| DE | 10328707 A1 | 2/2005 |
| DE | 102005059012 A1 | 6/2007 |

* cited by examiner

*Primary Examiner* — Ryan Stiglic
(74) *Attorney, Agent, or Firm* — Harness, Dickey & Pierce, P.L.C.

(57) ABSTRACT

A communication method and a master-slave system, for a field bus configures according to the AS-interface standard, are disclosed. Such a master-slave system for a field bus configured according to the AS-interface standard connects a master to a number of slaves. This field bus forms a first communication channel for the master and the slaves. In at least one embodiment, the master communicates with the slaves in sequence via telegrams, which are each uniquely associated with one of the slaves. Between the master and slaves a second communication channel is provided in at least one embodiment, via which one of the telegrams may be repeated, in addition to the first communication channel, if the communication of said telegram via the first communication channel has failed.

24 Claims, 2 Drawing Sheets

COMMUNICATION METHOD AND MASTER-SLAVE SYSTEM FOR A FIELD BUS CONFIGURED ACCORDING TO THE AS-INTERFACE STANDARD

PRIORITY STATEMENT

This application is the national phase under 35 U.S.C. §371 of PCT International Application No. PCT/EP2008/061700 which has an International filing date of Sep. 4, 2008, which designates the United States of America, and which claims priority on German patent application number DE 10 2007 046 440.3 filed Sep. 28, 2007, the entire contents of each of which are hereby incorporated herein by reference.

FIELD

At least one embodiment of the invention generally relates to a communication method for a field bus configured according to the AS-interface standard. At least one embodiment of the invention also generally relates to a master-slave system for such a field bus and/or to an associated control, actuator or sensor unit.

BACKGROUND

A field bus is an industrial communication system at the lowest control level of an automation system which connects a multiplicity of field devices such as sensors, actuators and drives (actuators) to a control device.

The AS interface (AS-I=Actuator-Sensor Interface) is one possible communication standard for communication between the control device (master) and the field devices (slaves) via such a field bus.

In the case of a field bus designed according to the AS-interface specifications, the master is the only component which has the right to access the field bus without being asked to do so. In this case, the master cyclically interrogates all slaves and interchanges the input and output data with the latter via a serial transmission protocol. The slaves must not and cannot access the field bus of their own accord and must wait until they are requested to do so by the master. A unique address is allocated to each of the slaves for this purpose. According to the current specification (vers. 2.11), a maximum of 62 subscribers can thus be connected to a master in an AS interface.

An unshielded two-core line which is preferably in the form of a ribbon cable and can also be simultaneously used as the power supply for slaves is used as the transmission medium for the field bus. For this purpose, the transmission protocol is modulated onto the voltage supply. Manchester coding and alternating pulse modulation coding (APM coding) are used in this case. Bit times of 6 µs can thus be achieved.

The master needs approximately 150 µs to interrogate each slave. A longer period of time is not currently provided in the AS interface since otherwise the cycle between two interrogations, in which the master always interrogates all 62 slaves in succession, would take too long. A message, via which a slave communicates with the master after the slave has been addressed, consists of 4 bits of useful data in this case. This results in extremely short master call and slave response times in the µs range during communication between the master and the slave.

The AS interface meets the interference immunity requirements for communication in industrial installations, inter alia, by virtue of the fact that, according to the AS-interface specifications, the messages can be repeated up to 6 times before an error message or stoppage of the installation results.

In order to increase the availability of the installation in the case of high interference levels as well, a second communication channel could be set up in parallel with the field bus, which communication channel is used to retransmit the same messages as those transmitted via the field bus. In the case of such redundant communication, it suffices for the respectively addressed subscriber to receive at least one of the two messages. Although such redundant systems then increase the installation availability as a result of the lower failure probability, they have a disadvantage. The disadvantage is that the same requirements in terms of volume of data to be transmitted and transmission speed as those imposed on the AS-interface field bus itself have to be imposed on this second communication channel. This renders such a solution complicated and thus expensive.

SUMMARY

At least one embodiment of the invention provides a communication method and a master-slave system as well as corresponding devices for a field bus configured according to the AS-interface standard, which reduce the failure probability of an installation planned in this manner.

In this respect, at least one embodiment of the invention provides for a field bus configured according to the AS-interface standard to be used as a first communication channel via which a master connected to the field bus serially communicates with a number of slaves connected to the field bus in a cycle, the master communicating with the slaves in succession in a cycle using messages which are each uniquely assigned to a slave, and a message being repeated in the first communication channel and in a second communication channel between the master and the slave if the communication of this message via the first communication channel has failed.

In the event of an error, the erroneous message is therefore repeated not only via this first communication channel but, in a redundant manner, via two communication channels which are separate from one another. This redundant communication then increases the probability of the message being successfully interchanged between the master and the slave despite interference in the first communication channel.

However, as a result of the fact that communication via the second channel is only required when the error occurs, that is to say a message has not been transmitted, lower requirements in terms of transmission quality (for example data rate or timing) can be imposed on the transmission medium of this second communication channel. Unlike the field bus, this transmission medium or this communication link therefore need not comply with the AS-interface specifications but can be wired in a more cost-effective manner. At least one embodiment of the invention thus allows the interference immunity of the communication between the master and the slaves to be improved with little effort. The failure probability of the installation can therefore be reduced and the availability of the planned installation can thus be increased.

If the duration (usually defined in advance) of the messages for the communication between the master and the slaves in the second communication channel is designed to be longer than the duration in the first communication channel, the timing requirements imposed on this second communication channel are lower than those imposed on the first communication channel.

According to at least one embodiment of the invention, the control units as the master and actuators or sensors as the slaves of a master-slave system can thus also be additionally connected to one another by means of wireless communication links, for example W-LAN or Bluetooth etc., as a second communication channel.

If only the repetition of a failed message is transmitted via the second communication channel and, in the event of further failure, the process continues with the next message for the next slave, the duration of the messages in the second communication channel is at most twice as long as the duration of the messages in the first communication channel. This also makes it possible to correct (FIG. 6) multiple errors, that is to say errors in successive messages, which further reduces the failure probability of the installation.

According to one advantageous refinement of at least one embodiment of the invention, when repeating one of the messages, the master call is started in a parallel manner and thus at least at the same time via the first communication channel and the second communication channel. The period of time available for a slave response in the second communication channel is thus maximized.

At least one embodiment of the invention thus results in a number of features which, individually or in combination, increase the reliability of the communication between the control unit as the master and the actuator or sensor units as slaves in a planned installation and thus considerably increase the installation availability in a simple and thus cost-effective manner.

BRIEF DESCRIPTION OF THE DRAWINGS

The invention is explained in more detail using example embodiments. In the drawings.

DETAILED DESCRIPTION OF THE EXAMPLE EMBODIMENTS

Figure 1:
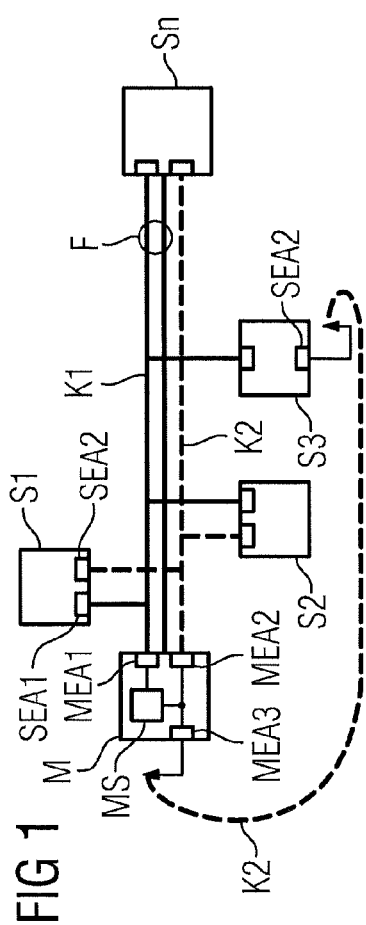
FIG. 1 shows a block diagram of the AS-I system.

In a field bus system planned as a master-slave system, a number of sensors and actuators of an industrial installation as slaves S1, S2, . . . , Sn are connected to a control unit as a master M via a bus system F. Such a system defined according to the AS-interface specifications is also referred to as a single-master system. The master M communicates in succession in recurring cycles with all slaves S1, S2, . . . , Sn which are planned and are thus assigned to it in order to interchange input and output data with said slaves in this manner. The currently defined version 2.11 of the AS-interface specification thus makes it possible for the master M to communicate with up to n=62 subscribers (slaves) in messages containing 4 bits of useful data. The basic structure of such a master-slave system is illustrated in FIG. 1. The field bus F is in the form of a two-core line which is simultaneously used for the communication and voltage supply of the communication electronics and slaves with a low power requirement.

Such planned installations are often situated in industrial environments having high interference levels which can interfere with the communication between the master and the slaves. Therefore, as indicated in FIG. 1, a second communication channel K2 is provided, according to the invention, between the master M and the slaves S1, S2, . . . , Sn in addition to this field bus F as a first communication channel K1, the master M being able to communicate with the slaves via said second communication channel in the event of an error. This reduces the probability of an interruption in communication between the master and the slaves and thus the failure of individual control units and actuators or sensors of an installation and thus considerably increases the installation availability of an installation planned in this manner.

According to an embodiment of the invention, the master M has for this purpose, in addition to the first input/output interface MEA1 for connecting the field bus F, further input/output interfaces MEA2, MEA3 for connecting at least one second communication link K2. In this case, as indicated in FIG. 1, this communication link may be, for example, a wired link, which is connected to the input/output interface MEA2 and is beside the field bus F in a manner parallel to the latter, or a wireless communication link which is connected to the input/output interface MEA3 via an antenna. A control apparatus MS in the master M then sends a message to be repeated via the first input/output interface (MEA1) and the further input/output interface (MEA2 or MEA3) and thus via both communication channels K1 and K2 if the communication of this message between the master M and the associated slave via the first communication channel K1 has previously failed. The communication between the master and the slaves via this second communication channel K2 is then effected via these further input/output interfaces MEA2 and MEA3 of the master and the corresponding further input/output interfaces SEA2 of the slaves S1, S2, . . . , Sn.

Figure 2:
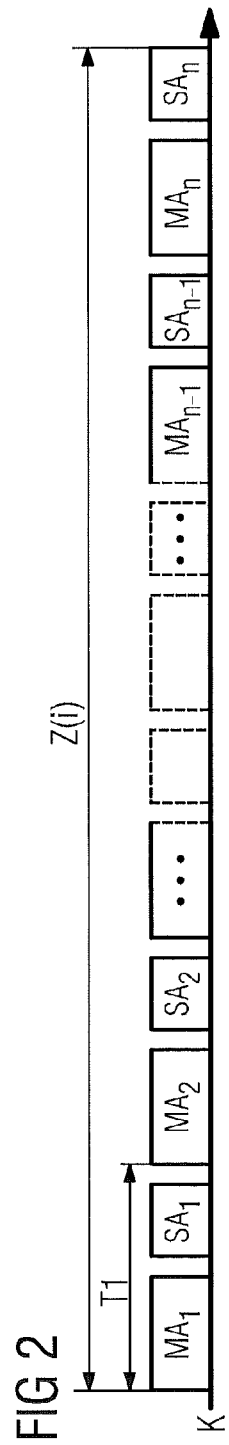
FIG. 2 shows the temporal sequence of a cycle for the communication between the master and the slaves according to the AS-interface specification.

FIG. 2 shows the communication between a master M and slaves S1, S2, . . . , Sn, as is currently defined in the AS-interface specifications. Within a cycle Z, the master M addresses the individual slaves S1, S2, . . . , Sn in succession, that is to say using a serial transmission protocol, in messages T1, T2, . . . , Tn with a permanently defined duration. The installation is planned in such a manner that each of the messages T1, T2, . . . , Tn contains an address which is uniquely assigned to one of the slaves S1, S2, . . . , Sn. Within the duration of a message, the master then communicates precisely with the slave determined by the address, while the remaining slaves ignore this message. If all n possible slaves (n=max. 62 slaves for AS-interface specification version 2.11, or n=max. 31 slaves for vers. 2.0) S1, S2, . . . , Sn have thus been addressed in succession within a cycle Z(i) using the corresponding messages T1, T2, . . . , Tn, this procedure is repeated in the next cycle Z(i+1). On the basis of a management phase between the two cycles, which is defined according to the AS-interface specifications, the individual slaves are again addressed in succession by the master in this respect.

In this case, a message T1, T2, . . . , Tn consists of a so-called master call MA and a slave response SA and has a length of typically slightly more than 150 μs according to the current AS-interface specification. The master can use the master call MA to transmit a maximum of 14 bits to the respective slave determined by the address of the message during a period of 84 μs. In response to this master call MA, the slave must then have sent a slave response SA back to the master within these 150 μs which begin with the start of the master call MA. With this slave response SA, the slave then has the opportunity to send a maximum of 7 bits of information back to the master within 42 μs. The amount of time of approximately 28 μs which remains in a message with a duration of 150 μs in addition to this master call MA and slave response SA is required as a pause time for the master and the slave. These pause times are required so that the master and the slave can prepare for the next master call and the next slave response or can preprocess received master calls and slave responses. In addition, signal propagation times and delay times of the field bus and of possible repeaters arranged in the field bus are compensated for by these pause times.

As illustrated in FIG. 2, the master M will thus first of all send a first master call MA1 to the first slave S1 within a cycle Z beginning with a message T1 with a duration of 150 µs and will then wait for a slave response SA1 from the slave. In the next message T2, the master will then send a master call MA2 to the second slave S2 and will wait for a slave response SA2 from the latter within the duration of the message T2. The individual slaves S1, S2, . . . , Sn are thus interrogated in succession, that is to say serially, by the master M using a master request MA1, MA2, . . . , MAn and corresponding responses as a slave response SA1, SA2, . . . , SAn are expected from the slaves.

If too many errors now occur within individual messages during transmission, the installation may be disrupted. The manner in which this can be avoided is intended to be described below by way of example using the four scenarios illustrated in FIG. 3 to FIG. 6.

Figure 3:
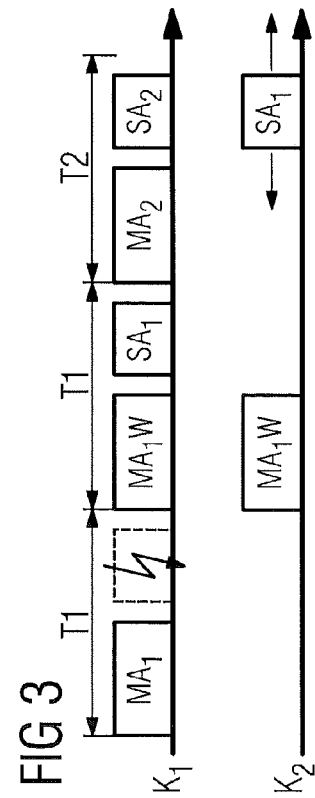
FIGS. 3-6 show four possible communication scenarios according to an embodiment of the present invention.

FIG. 3 shows the temporal profile in the two communication channels K1 and K2, in which the communication with the first slave S1 has been disrupted. In this case, the master M does not receive a slave response SA1 from the slave S1 in response to its transmitted master call MA1 in the first message T1 in the first communication channel K1. On the one hand, this could be due to the fact that the communication between the master and the slave has been disrupted in such a manner that the slave has not already received the master call MA1 or the master does not receive a slave response SA1. In both cases, however, the master will assume a communication disruption and will thus again repeat the master call MA1W to the same slave S1 in the next message T1.

According to an embodiment of the invention, the master M will then send this repeated master call MA1W via the first communication channel K1 again and additionally via the second communication channel K2. If only a single repetition of an erroneous message in a cycle Z is provided according to the currently valid AS-interface specification, the master will either wait for a slave response SA1 in the first communication channel K1 within the duration of the message T or will wait for said response in the second communication channel K2 within a duration which may be longer than the duration in the first communication channel K1. The master could thus receive the slave response SA1 in the second communication channel K2 immediately after the repeated master call MA1W or else at a much later time but within the cycle Z. This is indicated by the arrows around SA1 in FIG. 3. However, the best performance can be achieved if the slave response SA1 is received in the second communication channel K2 within a duration which is twice as long as the duration of the messages in the first communication channel K1.

In the case of the messages T illustrated in FIG. 3, the duration of a slave response SA1 via the second communication channel K2 is the same as that of a slave response SA1 via the first communication channel K1. Although this means that the slave has to transmit a slave response SA1 at the same gross data rate in the two communication channels K1 and K2, the pause times between the repeated master call MA1W and the slave response SA1 are simultaneously increased in the second communication channel K2. Lower requirements in terms of the timing and thus the transmission quality than those imposed on the first communication channel K1 can therefore be imposed on the second communication channel K2. On the other hand, however, the duration for the slave response SA1 itself could also be considerably extended in the second communication channel K2, as indicated using hatching in FIG. 4. Lower requirements are thus imposed on the data rate to be transmitted and thus again on the transmission quality of this second communication channel K2.

In addition, the actual duration for the repeated master call MA1W could also be longer in K2 than in K1 (not illustrated), which again reduces the data rate in the second communication channel K2. Both exemplary embodiments or any mixed form thereof thus allow the second communication channel K2 to be designed in a more cost-effective manner than the first communication channel K1 on account of the lower requirements imposed on the transmission quality.

Figure 4:
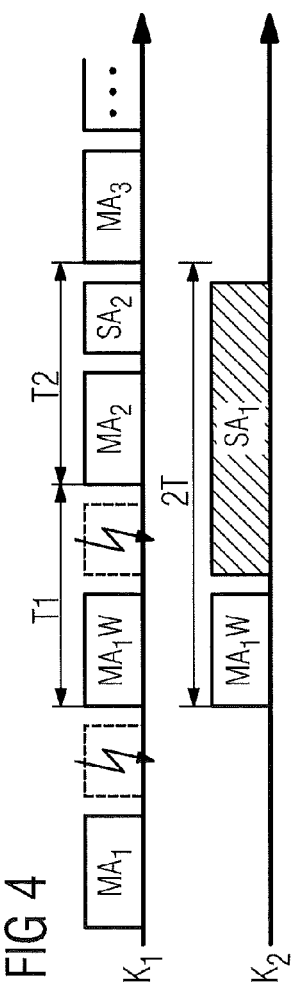
Figure 5:
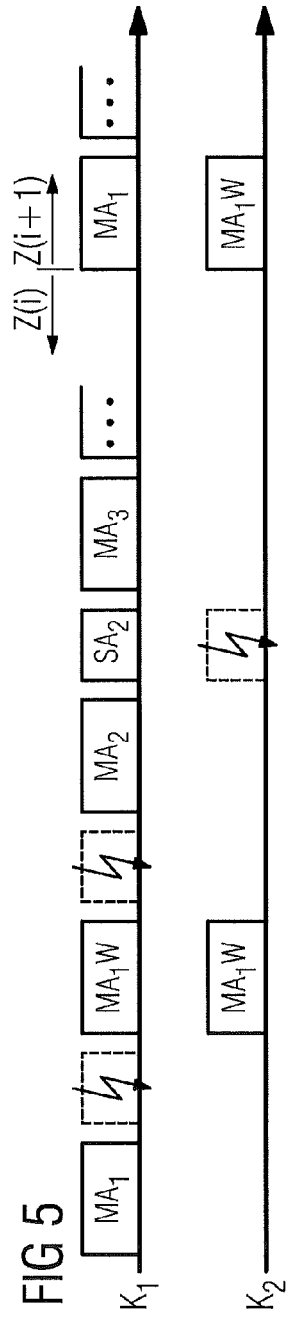

FIG. 4 and FIG. 5 show communication via the first communication channel (K1) and the second communication channel (K2), in which the slave response SA1 not only to the first master call MA1 but also to its repeated master call MA1W is absent. If it has been defined that the duration of the message T in the second communication channel K2 is twice as long as in the first communication channel K1, the master will wait for a slave response SA1 in the second communication channel K2 only for the period 2T. If, as indicated in FIG. 4, a slave response SA1 is received in the second communication channel K2 at the latest at the end of the expected slave response SA2 in the first communication channel K1, the master will not detect an error and will readily continue with its communication. If, however, as indicated in FIG. 5, the master has then not yet received a slave response SA1 to the repeated master call MA1 either via the second communication channel K2 in the first cycle Z(i), the master will indeed continue its communication but will also store this error as failed communication with the slave S1. In the next cycle Z(i+1), the master will then immediately again attempt to address this slave S1 via the first communication channel (K1) and the second communication channel (K2) using a master call MA1 in order to obtain a slave response SA1.

Figure 6:
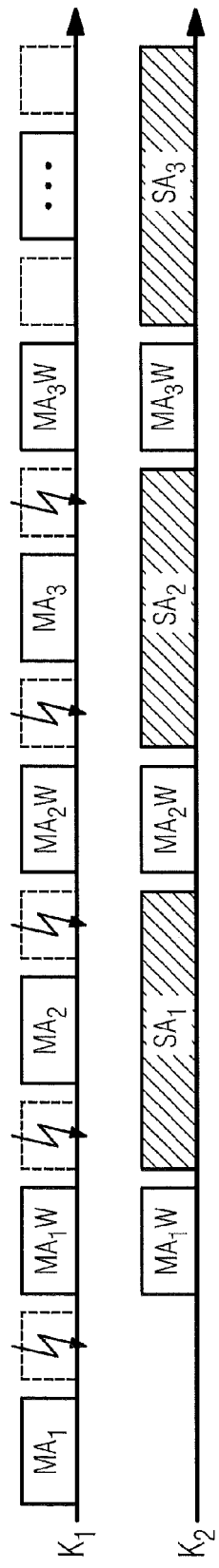

FIG. 6 shows a highly disrupted first communication channel K1 in which the master does not receive a slave response from any of the addressed slaves. The best possible performance for this situation results if the message duration is twice as long in the second communication channel K2 as in the first communication channel K1.

That is to say the master respectively has the opportunity to receive a slave response SA1, SA2, . . . SA(n−1) to the repeated master calls MA1, MA2, . . . Ma(n−1) via the second communication channel K2 within the areas illustrated using hatching and thus to improve the interference immunity of the communication between the master and the slaves planned for this purpose.

Even if an embodiment of the invention was previously described, by way of example, for a master-slave system according to the present vers. 2.11 of the AS-interface specifications, it is not intended to be limited thereto. The concept according to an embodiment of the invention of providing a second communication channel with a lower transmission quality, in addition to the known AS-interface field bus as a first communication channel, for the case of erroneous communication in the first communication channel can be applied to any other AS-interface specification or specifications similar to the latter. The important factor is that the communication method according to an embodiment of the invention and the corresponding apparatuses are used to increase the interference immunity of the master-slave system and thus of the planned installation with as little effort as possible without influencing the communication via the first channel, as defined by the AS-interface specifications.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A communication method for a field bus configured according to an AS-interface standard as a first communication channel via which a master connected to the field bus is able to serially communicates with a number of slaves connected to the field bus in a cycle, the method comprising:
using messages, when the master is communicating with the slaves in succession in a cycle, using messages which are each uniquely assigned to one of the slaves, wherein one of the messages is repeated in the first communication channel and in a second communication channel between the master and the slave, if the communication of the one of the messages via the first communication channel has failed.

2. The communication method as claimed in claim 1, wherein a defined duration of the messages for the communication between the master and the slaves in the second communication channel is relatively longer than in the first communication channel.

3. The communication method as claimed in claim 2, wherein a duration of the messages in the second communication channel is twice as long as a duration in the first communication channel.

4. The communication method as claimed in claim 1, wherein a message comprises a master call, in which data are transmitted from the master to a respective slave, and a slave response in which data from the called slave are transmitted to the master.

5. The communication method as claimed in claim 4, wherein, when repeating one of the messages, the master call is started in a parallel manner via the first communication channel and the second communication channel.

6. The communication method as claimed in claim 1, wherein, if the repetition of one of the messages also fails, the one of the messages is immediately repeated again in the next cycle via the first communication channel and the second communication channel.

7. A master-slave system comprising a control unit as a master, to communicates with a number of slaves assigned to the master using the communication method as claimed in claim 1.

8. A master-slave system for a field bus which is configured according to the AS-interface standard, connects a master to a number of slaves and forms, for the master and the slaves, a first communication channel via which the master is able to serially communicates with the slaves in a cycle, the master being able to communicate with the slaves in succession in a cycle using messages which are each uniquely assigned to one of the slaves, the system comprising: a second communication channel, provided between the master and the slaves, one of the messages being able to be re-communicated via the second communication channel and the first communication channel, if the communication of the one of the messages via the first communication channel has failed.

9. The master-slave system as claimed in claim, wherein the second communication channel has a relatively lower transmission quality than the first communication channel.

10. The master-slave system as claimed in claim 9, wherein the field bus as a first communication channel is a wired communication link and wherein the second communication channel is a wireless communication link between the master and the slaves.

11. A control unit as a master for a master-slave system as claimed in claim 9, comprising:

a first input/output interface for connecting the field bus as a first communication channel;
a further input/output interface for connecting a further transmission link as a second communication channel; and
a control apparatus to repeatedly transmit one of the messages via the first input/output interface and the further input/output interface if the communication of the one of the messages between the master and the associated slave via the first communication channel has previously failed.

12. The control unit as claimed in claim 11, wherein the second input/output interface and the further transmission link are designed for wireless communication.

13. An actuator or sensor unit as a slave for a master-slave system as claimed in claim 9, comprising:
a first input/output interface for connecting the field bus as a first communication channel; and
a further input/output interface for connecting a further communication link as a second communication channel, the further input/output interface and the further communication link being designed for wireless communication.

14. The master-slave system as claimed in claim 8, wherein the field bus as a first communication channel is a wired communication link and wherein the second communication channel is a wireless communication link between the master and the slaves.

15. A control unit as a master for a master-slave system as claimed in claim 8, comprising:
a first input/output interface for connecting the field bus as a first communication channel;
a further input/output interface for connecting a further transmission link as a second communication channel; and
a control apparatus to repeatedly transmits one of the messages via the first input/output interface and the further input/output interface if the communication of the one of the messages between the master and the associated slave via the first communication channel has previously failed.

16. The control unit as claimed in claim 15, wherein the second input/output interface and the further transmission link are designed for wireless communication.

17. An actuator or sensor unit as a slave for a master-slave system as claimed in claim 8, comprising:
a first input/output interface for connecting the field bus as a first communication channel; and
a further input/output interface for connecting a further communication link as a second communication channel, the further input/output interface and the further communication link being designed for wireless communication.

18. A communication method for a field bus, configured according to an AS-interface standard as a first communication channel for a master, connected to the field bus, to serially communicate with a number of slaves connected to the field bus in a cycle, the master being able to use messages, when communicating with the slaves in succession in a cycle, which are each uniquely assigned to one of the slaves, the method comprising: repeating one of the messages, for which communication in the first communication channel was attempted, via a second communication channel between the master and the slave and via the first communication channel, if the communication of the one of the messages via the first communication channel has failed.

19. The communication method as claimed in claim 18, wherein a defined duration of the messages for the communication between the master and the slaves in the second communication channel is relatively longer than in the first communication channel.

20. The communication method as claimed in claim 19, wherein a duration of the messages in the second communication channel is twice as long as a duration in the first communication channel.

21. The communication method as claimed in claim 18, wherein a message comprises a master call, in which data are transmitted from the master to a respective slave, and a slave response in which data from the called slave are transmitted to the master.

22. The communication method as claimed in claim 21, wherein, when repeating one of the messages, the master call is started in a parallel manner via the first communication channel and the second communication channel.

23. The communication method as claimed in claim 18, wherein, if the repetition of one of the messages also fails, the one of the messages is immediately repeated again in the next cycle via the first communication channel and the second communication channel.

24. A master-slave system comprising a control unit as a master, to communicate with a number of slaves assigned to the master using the communication method as claimed in claim 18.

* * * * *